United States Patent [19]

Shirk

[11] Patent Number: 5,283,416
[45] Date of Patent: Feb. 1, 1994

[54] LASER PROCESS MONITORING AND EVALUATION

[75] Inventor: Bryan W. Shirk, Mesa, Ariz.

[73] Assignee: TRW Inc., Lyndhurst, Ohio

[21] Appl. No.: 904,976

[22] Filed: Jun. 26, 1992

[51] Int. Cl.$^5$ ............................................. B23K 26/02
[52] U.S. Cl. ........................... 219/121.83; 219/121.63; 219/121.64
[58] Field of Search ....................... 219/121.63, 121.64, 219/121.83

[56] References Cited

U.S. PATENT DOCUMENTS 4,663,513 5/1987 Webber ........................... 219/121.83
4,766,285 8/1988 Decailloz et al. ............... 219/121.63

Primary Examiner—C. L. Albritton
Attorney, Agent, or Firm—Tarolli, Sundheim & Covell

[57] ABSTRACT

A monitoring system monitors a laser process which delivers energy from a laser source to a workpiece along a process path while producing plasma at a beam delivery point along the path. An infrared radiation detector is positioned for receiving infrared radiation from a point behind and in close proximity to the beam delivery point. The detector provides a temperature signal having a value which varies with changes in the intensity of the received infrared radiation over a predetermined test interval. A plurality of temperature limits are established with each temperature limit having a different value. The temperature signal is compared with each temperature limit and a violation indication is provided each time the temperature signal violates one of the limits. The number of violation indications for each limit are counted over the predetermined test interval. The laser process is evaluated as a function of the number of violation indications during the test interval. An output indication is provided as to the result of the evaluation.

17 Claims, 5 Drawing Sheets

LASER PROCESS MONITORING AND EVALUATION

FIELD OF THE INVENTION

This invention relates to monitoring a laser process, such as a welding process, and providing a quality evaluation of the process.

BACKGROUND OF THE INVENTION

The T. Webber U.S. Pat. No. 4,663,513 discloses a system for monitoring a laser process in which a laser source is employed for delivering energy to a workpiece along a process path while producing plasma at a beam delivery point along the path. An infrared detector receives infrared radiation from a point behind and in close proximity to the location of the beam delivery point. The radiation detector provides an analog temperature signal having a value which varies over time with changes in the intensity of the received infrared radiation. The analog temperature signal is compared against a window range of acceptable temperatures including a fixed upper limit and a fixed lower limit. If the temperature signal is not within the window range, then the output of the laser process, such as a welding process, is rejected.

It is to be particularly noted that the system described in the aforesaid patent provides either a process rejection or acceptance depending upon whether the temperature signal has a value which is within the window range or which is outside of the window range. Consequently, this is a pass-fail test. No teaching is presented for determining relative quality of the laser process. There is no suggestion that a plurality of samples be taken of the temperature signal with each of the samples being compared with a plurality of different temperature limits, the results of such comparisons being used to calculate a quality factor.

Still further, the aforesaid patent provides a fixed upper limit. This does not allow for a laser process having ranges of different, but normal, temperature values. For example, in a laser weld process, there is a turn-on overshoot condition which has an increased temperature. There may also be a weld overlap region on a workpiece which may produce an increased temperature during the weld process as the laser beam passes over a previously welded area.

Moreover, the aforesaid patent does not provide for archival storage of information so that the data obtained from a laser process analysis may be reviewed at a later point in time.

Additionally, the aforesaid patent does not provide for differentiating between normal weld sparking and detrimental splatter conditions when evaluating a laser weld process.

The present invention is directed toward improvements over the process and apparatus of the aforesaid patent to satisfy the foregoing shortcomings.

STATEMENT OF THE INVENTION

In accordance with the present invention, a laser process is monitored. The monitored process delivers energy from a laser source to a workpiece along a process path while producing plasma at a beam delivery point along the path. An infrared radiation detector is located for receiving infrared radiation from a point located behind and in close proximity to the beam delivery point. The detector provides a temperature signal which has a value that varies with changes in the intensity of the received infrared radiation over a predetermined test interval. The temperature signal is compared with each of a plurality of temperature limits having different values. A violation indication is provided each time the temperature signal violates one of the limits. The violation indications for each limit are counted during the predetermined test interval. The laser process is evaluated as a function of the number of violation indications during the test interval and an output indication is provided in accordance with the evaluation.

BRIEF DESCRIPTION OF THE DRAWINGS

The foregoing and other objects of the invention will become more readily apparent from the following description of the preferred embodiment of the invention as taken in conjunction with the accompanying drawings which are a part hereof and in which.

DESCRIPTION OF PREFERRED EMBODIMENT

Reference is now made to the drawings in which the showings are for purposes of illustrating a preferred embodiment of the invention only and not for limiting the invention.

Figure 1:
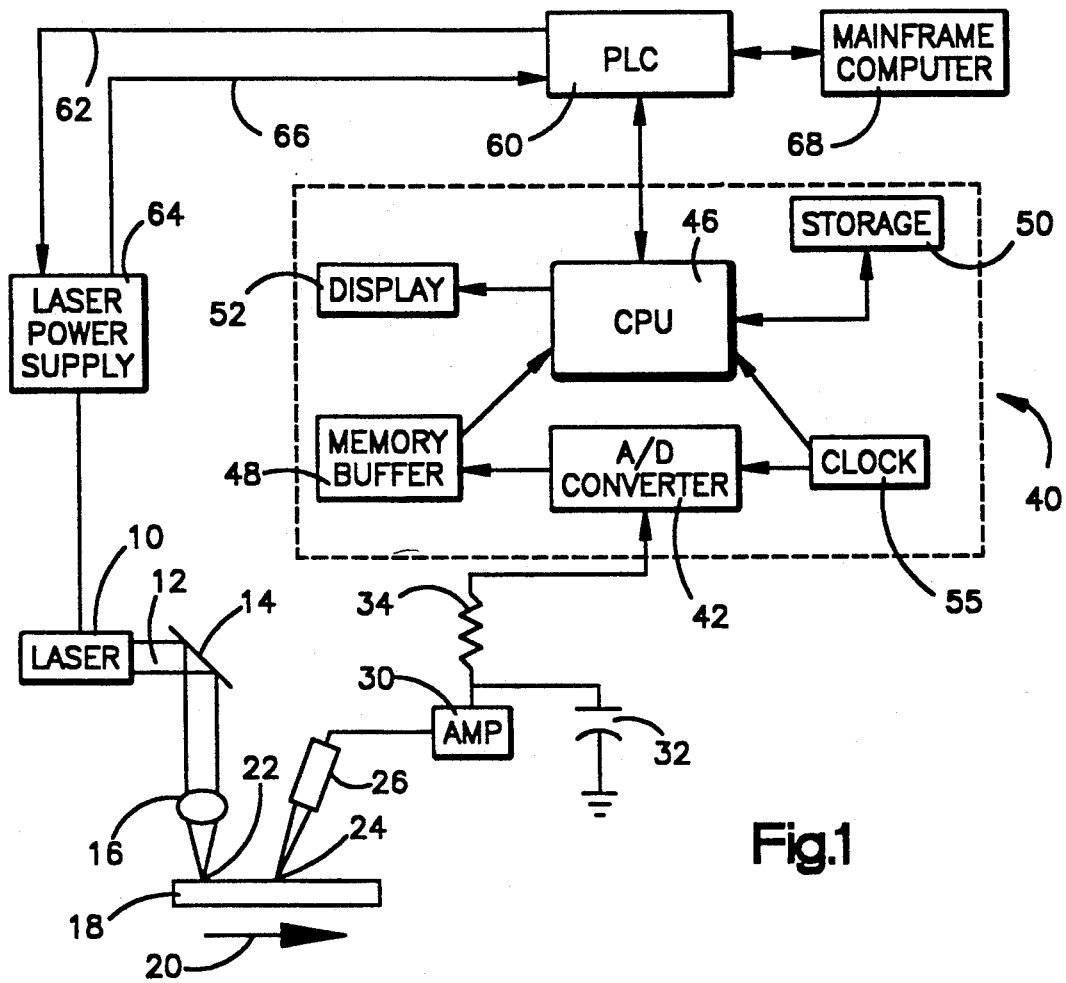
FIG. 1 is a schematic-block diagram illustration of one embodiment of the present invention.

FIG. 1 is a schematic-block diagram illustration of the monitoring system of the present invention which is employed for monitoring a laser welding process. In this process, a laser 10 transmits a laser beam 12. The beam 12 is redirected by a delivery system 14 and then focused by suitable focusing optics 16. The focused beam impinges on a workpiece 18, which travels in a direction indicated by the arrow 20. The laser beam impinges on the workpiece 18 at a weld location 22 with sufficient linear power density to form plasma to effect a weld. At a sensing location 24, the temperature of the re-solidifying weld is measured by a focused infrared detector 26. The output from the infrared detector 26 is passed by suitable fiber optic cabling to an amplifier 30. The amplifier 30 provides an amplified electrical temperature signal representative of the temperature at the sensing location 24. This electrical temperature signal is applied to a noise filter, which is comprised of a capacitor 32 and a resistor 34, and is then supplied to a microcomputer 40.

The microcomputer 40 may be of conventional design and includes an analog-to-digital converter 42 which is supplied with clock pulses from a clock 55. The analog-to-digital converter 42 receives the temperature signal and in a known manner provides temperature samples at the frequency of the clock pulses. These temperature samples are digital words which are supplied to a central processing unit (CPU) 46 by way of a memory buffer 48. The CPU 46 stores the received data, including the temperature samples, in a storage 50, which may take the form of a hard disk. A temperature waveform and other data may be displayed under control of the CPU 46 on a conventional display 52, which may incorporate a cathode ray tube.

The CPU 46 communicates with a programmable logic controller (PLC) 60. The PLC 60 may take the form of another microcomputer. The PLC 60 controls the welding process and activates the monitoring system. The PLC 60 starts the welding process by applying a "start weld" signal on control line 62 to a laser power supply 64 which, in turn, energizes the laser 10. The operation of the laser power supply 64 may be monitored by the PLC 60 through line 66 for such information as a power fault or weld completed. Whenever the PLC 60 starts a weld process, it also activates the microcomputer 40 with a trigger signal so that the process as presented by the flow chart in FIG. 3 may commence. The PLC 60 also communicates with a main frame computer 68. The computer 68 may be used, for example, for long term storage. This facilitates traceability in the event that information is sought at a later time with respect to a particular weld process. Thus, for example, a workpiece serial number may be used to identify particular weld information and permit the computer 68 to find and retrieve that information.

Figure 2:
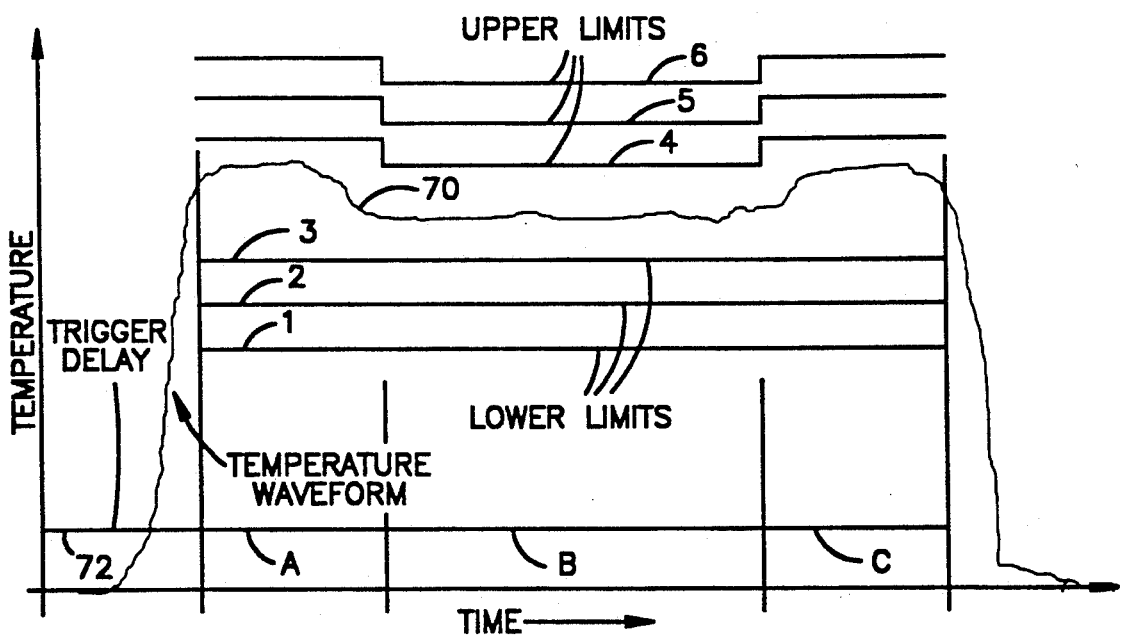
FIG. 2 is a graphical illustration of temperature with respect to time which is useful in describing the operation of the invention; and, FIG. 3, including
Figure 3A:
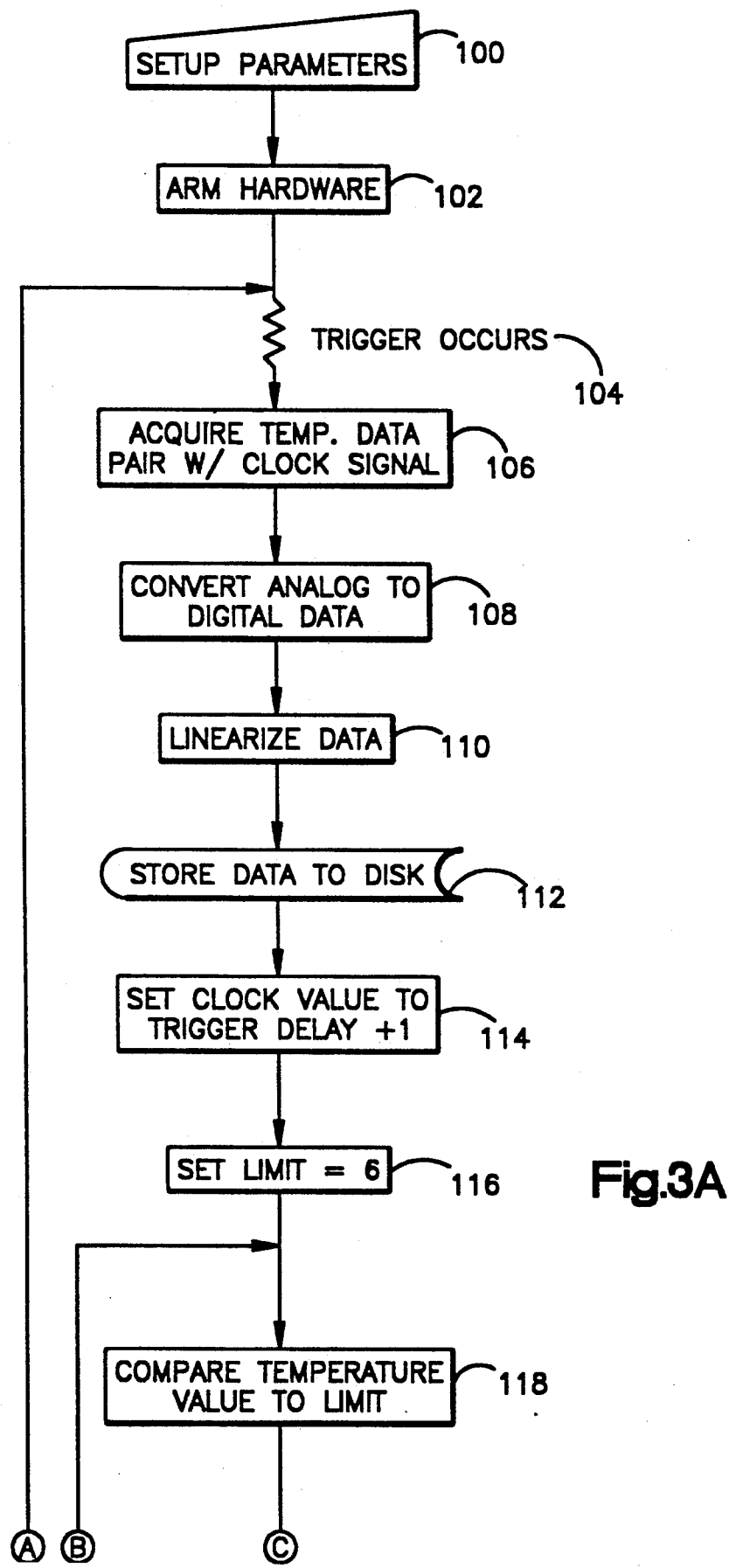
FIGS. 3A–3D, is a flow diagram illustrating the operation of the microcomputer employed in FIG. 1.
Figure 3B:
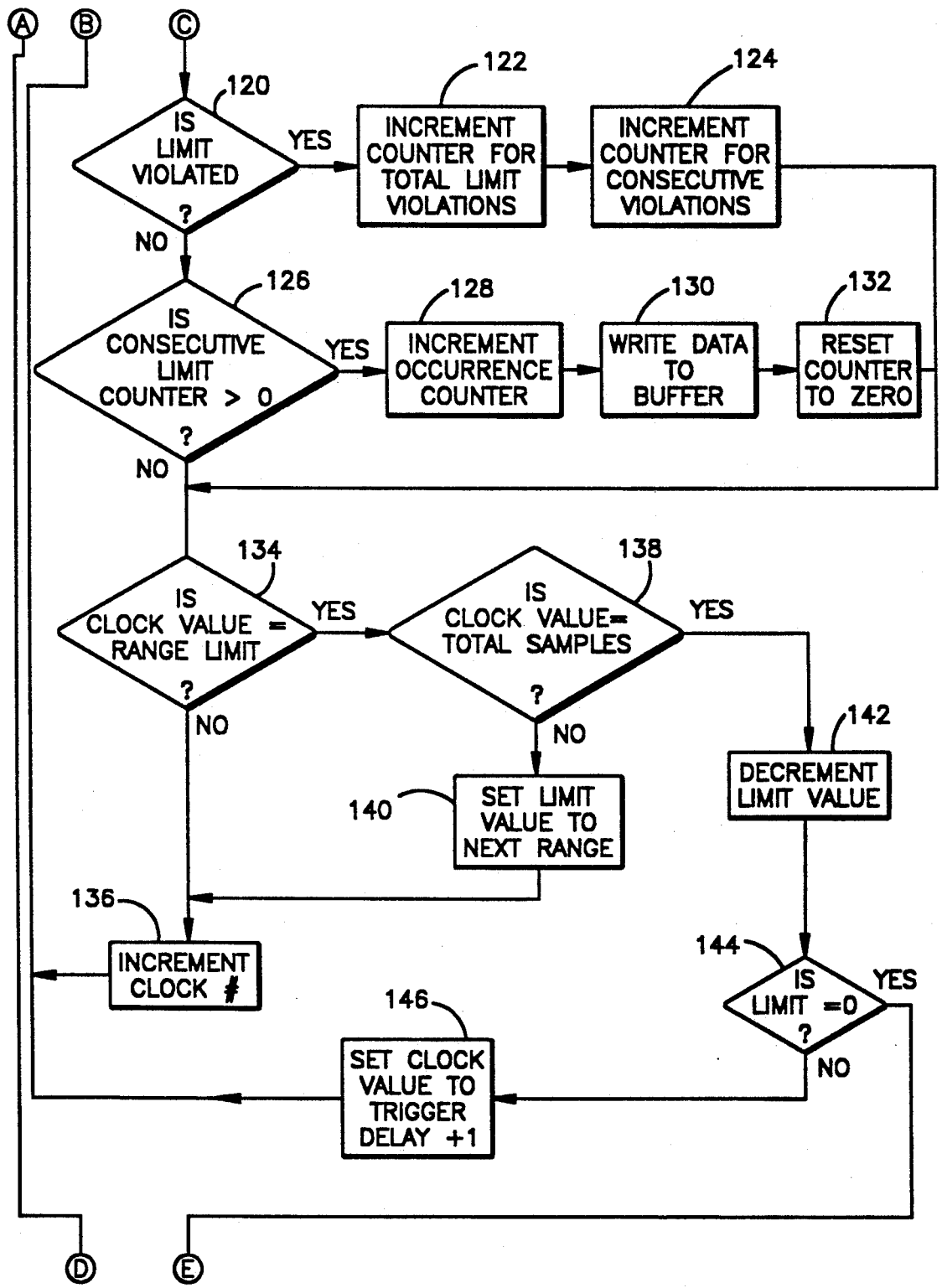
Figure 3C:
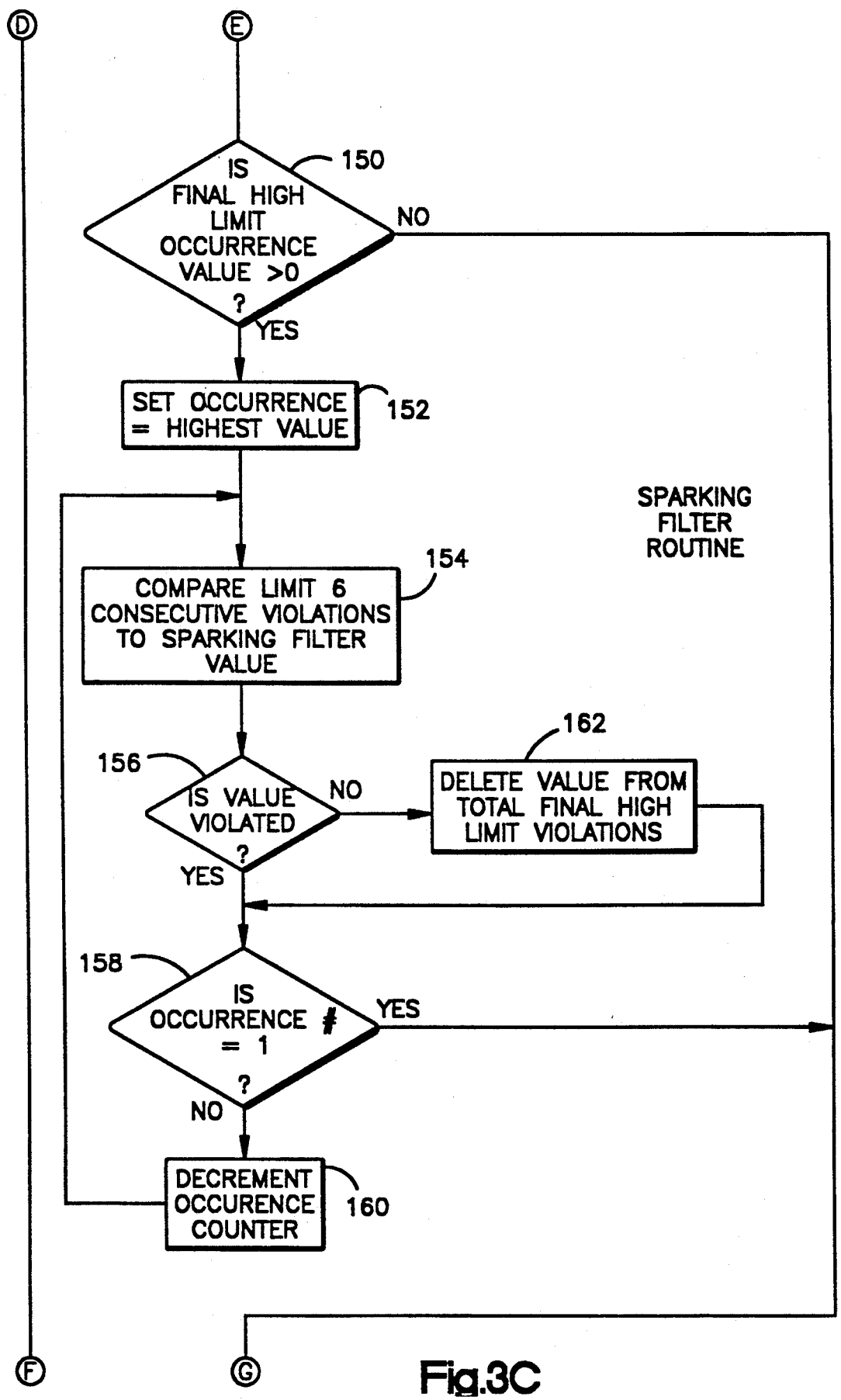
Figure 3D:
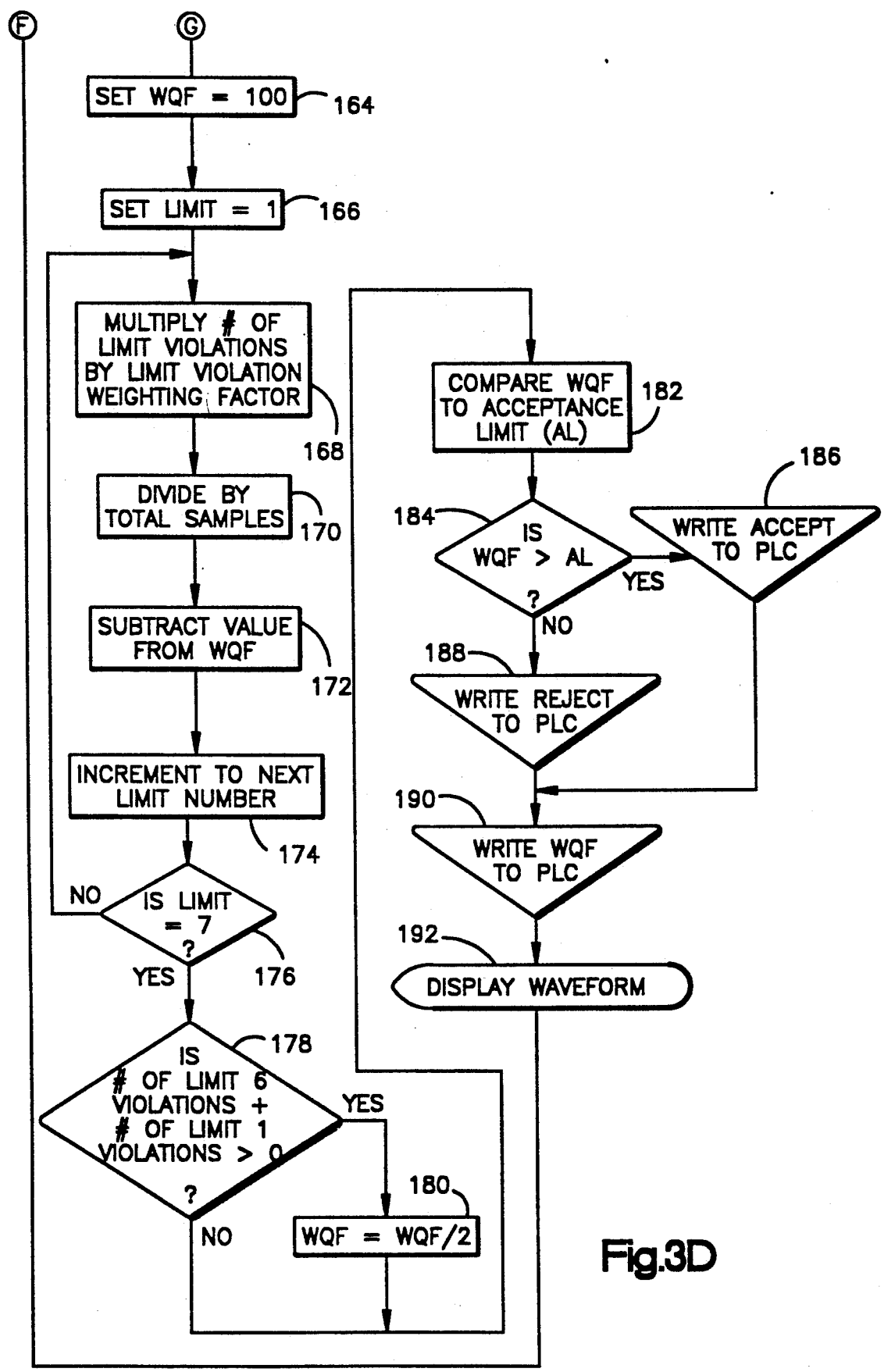

FIG. 2 is a graphical illustration of temperature with respect to time. A weld temperature curve 70 is plotted from the temperature signal are taken by the temperature detector 26 in accordance with the invention. Specifically, the curve 70 represents a large number of samples provided by the analog-to-digital converter 42. The total samples may be on the order of 1,600. Initially, there is a trigger delay 72 during which the samples are not used to evaluate the process. The trigger delay 72 may, in terms of sample time, have a duration of 100 samples. Range A is the turn-on overshoot range. This is the initial portion of the weld, and the temperature is typically higher than normal as the laser turns on to a higher energy state before it is regulated. If the total number of samples taken is 1,600, then range A may have a duration on the order of 300 samples.

Range B is the standard weld portion of the weld where the laser power is regulated. This covers the majority of the weld and out of a total of 1,600 samples, this range may have a duration on the order of 900 samples. The final or last range of the weld is range C. This is the overlap portion where the temperature again increases as a result of welding over a portion of a part that retained heat from a prior weld operation. Range C may have a duration on the order of 300 samples.

In accordance with the present invention, the weld monitoring system is employed to evaluate temperature samples taken from the resolidification zone of the weld during the welding operation. This permits detection of such failures as pinholes, interrupted welds, part mismatch, gaps in the part interface, insufficient laser power and improper speed. The monitoring system employs limits for the temperature samples. The system counts the number of times the limits are violated by the samples and uses that number for calculating a weld quality factor (WQF). The weld quality factor (WQF) is compared with a predetermined weld acceptance limit (AL) to determine weld acceptability.

Referring again to FIG. 2, the temperature samples making up the curve 70 are compared against lower and upper limits. These limits are indicated as lower limits 1, 2 and 3, and upper limits 4, 5, and 6. The microcomputer is programmed, as will be discussed hereinafter, to keep track of the number of violations of limits 1-6 by the various temperature samples. The weld quality factor WQF is then calculated by a formula in which the number of limit violations for each limit 1-6 is multiplied by a weighting factor (WF) unique to that particular limit. The result is divided by the total number of samples. This calculation is made for each of the limits 1-6. The sum total of the individual limit calculations is then subtracted from 100 so that the weld quality factor WQF will be a number less than 100, such as 92.5, for example. The weld quality factor WQF is then compared with a weld acceptance limit AL to determine whether the weld is acceptable. The acceptance limit AL may, for example, be set at 70. Any calculated weld quality factor WQF in excess of 70 will be considered to represent an acceptable weld. The value of the weld quality factor WQF and the acceptability or nonacceptability of the weld is supplied by the microcomputer 40 to the PLC 60. The microcomputer 40 will then display the temperature waveform, such as waveform 70, on its video display 52.

In FIG. 3, a flow chart shows the manner in which the microcomputer 40 is programmed in accordance with present invention. At step 100, various parameters employed in the program are entered, as with a keyboard. These parameters include, for example, the values of the limits 1, 2, 3, 4, 5, and 6, and the value of the weighting factor for each limit. In the next step 102, the microcomputer waits for a trigger signal from PLC 60 to commence data acquisition. The trigger signal occurs at point 104 just prior to step 106. During step 106, the temperature data is acquired and paired with a clock signal so as to obtain paired data. This data is converted by an analog-to-digital converter at step 108 so as to provide a stream of digital data words representative of the respective temperature samples. The data words are then linearized at step 110 and the data is stored, such as with a hard disk storage 50, at step 112. The CPU is now ready to start analyzing the data.

At step 114, a clock counter is set to the value of the trigger delay 72 (FIG. 2) plus one. In the example being presented, the trigger delay 72 is 100 samples. Thus, the clock value is set to 101. At step 116, the limit is set to 6. Each sample, from sample 101 through sample 1,600 at the end of range C, will now be retrieved from storage 50 and analyzed, one at a time. Each temperature sample is compared to the temperature value of limit 6 at step 118. A decision is made as to whether the sample violates limit 6 at step 120. If limit 6 is violated, then a total limit violation counter is incremented by one at step 122 and a consecutive violation counter is incremented by one at step 124. If this is the first sample to be analyzed, and if the temperature sample violates the limit, then both the total limit counter and the consecutive violation counter are set to a count of 1.

If the limit is not violated, then a decision is made at step 126 as to whether the consecutive limit counter has a count greater than zero. If the consecutive violation count is greater than zero, then an occurrence counter is incremented by one, at step 128. This information is written into a buffer at step 130, and the consecutive violation counter is reset to zero at step 132.

Assume that in a chain of eight successive temperature samples, that the first two samples violated the limit, that the third sample did not violate the limit, that samples 4 through 7 violated the limit and that sample 8 did not. In this case, after sample 2 has been analyzed, the data written into the buffer at step 130 will be 1, 2. This means that there has been one occurrence of a consecutive violation and that the number of consecutive violations is 2. After that data has been written into the buffer, the consecutive violation counter is reset to zero. The next consecutive violations take the form of samples 4, 5, 6 and 7. That is the second occurrence and the number of consecutive violations is four (samples 4, 5, 6 and 7). Consequently, the data written into the buffer at step 130 will be 2, 4. Assume that the next six temperature samples 9 through 14 also represent violations of the limit, then after sample 14 has been analyzed, the data written into the buffer at step 130 will be 3, 6 (the third occurrence with six consecutive violations).

Continuing now with a discussion of the flow chart, if the count in the consecutive limit counter is not greater than zero, then the procedure skips to step 134. In step 134, a decision is made as to whether the clock value is equal to the range limit. During each analysis for violations of a limit, such as limit 6, there are three ranges, including ranges A, B and C (see FIG. 2). The value of a limit may differ in ranges A, B and C. This is particularly true with respect to the upper limits, as is noted in FIG. 2. Assume limit 6 is 1,200° C. For range A, limit 6 may be increased by 4%. Limit 6 may also be increased by another amount, such as 3%, during range C. These percentages and the limit values are all entered into the computer during step 100.

In the example being presented, there are a total of 1,600 temperature samples with 100 samples allocated to the trigger delay period 72, 300 samples in range A, 900 samples in range B and 300 samples in range C. At the end of range A, there should be a clock count of 400 samples. If the count is less than that, the clock counter is incremented at step 136 and the foregoing procedure from step 118 through step 134 is repeated until all of the samples through range A have been analyzed.

Once all of the samples in a range have been analyzed, a decision is made as to whether the clock value is equal to the total number of samples, at step 138. A "yes" decision will occur only upon the completion of analyzing all of the samples, at sample count 1,600. If only the samples through range A have been counted, the limit value is adjusted for the next range at step 140 and the clock is incremented by one. This will be the first sample in the next range, such as range B.

If all of the samples through range C have been analyzed, then the clock value in this example will be 1,600 which is equal to the total number of samples. In such case, the limit value will be decremented by one at step 142 so that the limit is now set at 5. At step 144, a decision is made as to whether the limit value is equal to zero. If not, then at step 146, the clock value is reset to the value of the trigger delay 72 (a count of 100) plus one and the foregoing analysis from temperature sample 101 to sample 1,600 will be repeated with respect to limit 5. At this point, it should be noted that steps 124, 126, 128, 130 and 132 are employed in the analysis only for limit 6 violations. When the limit value is determined to be equal to zero in step 144, the following sparking filter routine is started.

During a welding operation, there are sparks. Some sparks are mild, and others are more violent. The latter are known as the splatter type and result from a violent expulsion of molten metal from the weld pool. The analysis of this invention differentiates between these two types of spark conditions. If the duration of the spark condition is short, such as five one thousandths (0.005) of a second, it is a mild spark. If it is longer, then it has mass and it is a splatter type. In the latter type of situation, the analysis looks for consecutive limit violations of sufficient duration relative to a sparking filter limit value. In the example to be described below, the sparking filter limit value for consecutive violations is 5.

In the sparking filter routine, a decision is made at step 150 as to whether the final high limit occurrence value for the number of consecutive violations exceeded zero. In the example being given, the last data that was written into the buffer at step 130 was 3,6 (the third consecutive violation detection with six consecutive violations). It is the number 3 that is of interest and that number is set in occurrence counter at step 152. At step 154, the number of limit 6 consecutive violations (i.e., 6) is compared with the sparking filter limit value (5). A decision is made in step 156 as to whether the sparking filter limit value has been violated. Since there were 6 consecutive violations, and the sparking filter limit is 5, the answer to the decision at step 156 is "yes". The procedure then moves to step 158 at which a comparison is made as to whether the occurrence number (i.e., 3) is equal to 1. Since it is not, the procedure moves to step 160 at which the occurrence counter is decremented by 1 (i.e., from 3 to 2).

The limit 6 consecutive violations for an occurrence count of 2 is 4, in the example being considered. Since this count (4) is less than the sparking limit (5), the decision at step 156 is "no". The count (4) is deducted from the total final high limit violation count at step 162. The total is 12 in the example being given since the data pairs are 1,2 and 2,4 and 3,6 with the second numbers totaling 12. It is this final limit violation (12) from which the new consecutive number of violations (4) is deleted in step 162. This leaves a total final high limit violation count of 8. The occurrence number (2) is compared to 1 at step 158. Since a match is not obtained, the occurrence number is again decremented at step 160 to occurrence number 1. The number of consecutive violations associated with occurrence number 1 is 2 (from the above example). Thus, the number of limit 6 consecutive violations (2) is compared with the sparking filter limit value of 5 at step 154. Since the value is not violated, the consecutive violation number (2) is deleted from the high limit violations of 8, leaving a total high limit violation count of 6, at step 162. Since the number in the occurrence counter is now 1, a match is obtained at step 158 and the procedure moves on to step 164 which commences the weld quality factor WQF calculation routine.

At step 164, the weld quality factor WQF is set to equal 100. At step 166 the limit number is set as limit number 1. This means that the routine will calculate that portion of the weld quality factor associated with the number of violations of limit 1. As discussed hereinbefore, the limits 1–6 are weighted. The weighting factor (WF) for limit 1 is 780. For limit 2, it is 360. For limit 3, it is 60. The weighting factor is 60 for limit 4, 360 for limit 5, and 780 for limit 6. In the calculation set forth in step 168, the number of limit violations is multiplied by the weighting factor. Assume that the number of limit 1 violations is 5. The product of the number of limit 1 violations (5) and the associated limit 1 weighting factor (780) is 3,900. This number (3,900) is then divided by the total number of samples at step 170. In the example being given, the total number of samples is 1,600. Hence, the result is 2.43. This number is now subtracted from 100 leaving a result of 97.57 at step 172. At step 174, the limit number is incremented to the next limit (2). Because the limit number is not 7, a decision is made at step 176, to repeat steps 168–174.

The above steps 168-174 are repeated for limit 2 through limit 6 violations. After the limit 6 violations have been considered, the limit number is incremented to 7 at step 174. This number matches the limit set in step 176, and the procedure moves to a decision step 178. At step 178, a determination is made as to whether there are any limit 1 violations or any limit 6 violations. If so, then this is considered an absolute weld failure condition, and the weld should be rejected. The weld quality factor WQF is written as one-half of the value of the calculated weld quality factor WQF at step 180. Thus, if there is only one violation and this is a limit 6 violation, the highest number to be obtained for the calculated weld quality factor WQF is 99. Since this is a limit 6 violation, the calculated weld quality factor is divided by two, leaving a revised weld quality factor WQF of 49.5. As will be brought out below, the acceptance limit AL may be set at a level of 70 and, hence, a weld quality factor WQF of 49.5 represents a weld failure.

At this point, the procedure moves to step 182 at which the calculated weld quality factor WQF has been determined with respect to all of the limits 1-6. If there are no violations at all, then the weld quality factor WQF is equal to 100. It is less than 100 depending upon the number of violations noted above.

The acceptance limit AL may be set at some number such as 70. Thus, a weld quality factor WQF in excess of 70 will be considered to represent an acceptable weld. At step 184, the calculated weld quality factor WQF is compared with the "acceptance" limit AL. If it is greater than the acceptance limit, then in accordance with step 186, the CPU writes "accept" to the PLC 60. This information may be forwarded to the main frame computer 68 for retrieval at a subsequent time. If the calculated weld quality factor does not exceed the acceptance limit, then in accordance with step 188, the CPU writes "reject" to the PLC 60 so that the PLC has information that this particular weld was rejected. The calculated weld quality factor for this particular weld is then, in accordance with step 190, written into the PLC. The temperature waveform, such as waveform 70, is also displayed on the video display 52 in accordance with step 192. The monitoring system is now in condition for monitoring another weld process and determining the weld quality factor WQF for such process.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for monitoring a laser process which delivers energy from a laser source to a workpiece along a process path while producing plasma at a beam delivery point along said path, comprising:

infrared radiation detecting means for receiving infrared radiation from a point behind and in close proximity to said beam delivery point and providing a temperature signal having a value which varies with changes in the intensity of the received infrared radiation over a predetermined test interval;

means for providing a plurality of temperature limits with each temperature limit having a different value;

means for comparing said temperature signal with each of said temperature limits and providing a violation indication each time said temperature signal violates one of said limits;

means for counting the number of said violation indications for each limit during said predetermined test interval;

means for evaluating the weld process as a function of the number of violation indications for all of said limits during said test interval; and means for providing an output indication of said evaluation.

2. An apparatus as set forth in claim 1 wherein said plurality of temperature limits includes a first upper temperature limit and a first low temperature limit.

3. An apparatus as set forth in claim 2 wherein said predetermined test interval includes at least two ranges and wherein said first upper temperature limit has a different value for each of said ranges.

4. An apparatus as set forth in claim 2 including at least a second upper temperature limit which is higher than said first upper temperature limit and a second low temperature limit which is lower than said first low temperature limit.

5. An apparatus as set forth in claim 4 wherein weighted values are assigned to said temperature limits and wherein said second upper temperature limit has a weighted value greater than that of said first upper temperature limit and wherein said second low temperature limit has a weighted value greater than said first low temperature limit.

6. An apparatus as set forth in claim 1 wherein said temperature signal is an analog temperature signal, and said apparatus further comprises means for sampling said analog temperature signal and providing a predetermined number of temperature signal samples for application to said comparing means, said comparing means including means for receiving said temperature signal samples and comparing each said sample with each of said temperature limits and providing a violation indication each time a temperature signal sample violates one of said limits.

7. An apparatus as set forth in claim 6 wherein said sampling means includes analog-to-digital means for converting said analog temperature signal into said predetermined number of temperature signal samples.

8. An apparatus as set forth in claim 7 wherein a limit violation weighting factor is assigned to each of said limits and said apparatus further comprises means for multiplying the number of limit violation indications for each limit by the assigned weighting factor for that limit to obtain a product and dividing that product by said total number of samples so as to provide a result for each limit and subtracting the sum of the results for all of said limits from 100 to obtain a weld quality factor.

9. An apparatus as set forth in claim 8 including means for comparing said weld quality factor with an acceptable limit and for providing an output indication based on said comparison.

10. An apparatus as set forth in claim 9 including means responsive to said output indication for providing information respecting said output indication for application to a main computer means for storage in and subsequent retrieval from said main computer means.

11. An apparatus as set forth in claim 6 including consecutive counter means for counting the number of consecutive limit violation indications of a selected one of said limits, and means for comparing the number of said consecutive limit violation indications with a predetermined filter value to determine if said filter value has been violated.

12. A method for monitoring a laser process wherein energy from a laser source is delivered to a workpiece along a process path while producing plasma at a beam delivery point along said path, and comprising the steps of:

positioning an infrared radiation detecting means so that said detecting means receives infrared radiation from a point behind and in close proximity to the beam delivery point and provides a temperature signal having a value which varies with changes in the intensity of the received infrared radiation over a predetermined test interval;

providing a plurality of temperature limits with each limit having a different value;

providing a predetermined plurality of temperature samples of said temperature signal over a predetermined test interval;

comparing each said temperature sample with each of said temperature limits and providing a violation indication each time a temperature sample violates one of said limits;

counting the number of violation indications for each limit during the predetermined test interval;

evaluating the laser process as a function of the number of violation indications; and providing an output indication of the evaluation.

13. A method as set forth in claim 12 wherein said step of providing a plurality of temperature limits includes providing a first upper temperature limit and wherein said predetermined test interval includes at least two ranges and wherein said first upper temperature limit has a different value for each of said ranges.

14. A method as set forth in claim 12 wherein said step of providing a plurality of temperature limits includes providing a first upper temperature limit and a first low temperature limit and a second upper temperature limit which is higher than said first upper temperature limit and a second low temperature limit which is lower than said first low temperature limit.

15. A method as set forth in claim 14 including the step of assigning weighted values to said temperature limits and wherein said second upper temperature limit has a weighted value assigned to it which is greater than that assigned to said first upper temperature limit and wherein the weighted value assigned to said second low temperature limit is greater than that assigned to said first low temperature limit.

16. A method as set forth in claim 12 wherein a limit violation weighting factor is assigned to each of said limits and wherein the number of limit violations for each limit is multiplied by that limit's assigned weighting factor to obtain a product and wherein that product is divided by the total number of said predetermined plurality of samples so as to provide a result for each said limit and then subtracting the sum of said results for all of said limits from 100 to obtain a weld quality factor.

17. A method as set forth in claim 16 wherein said weld quality factor is compared with an acceptable limit for providing an output indication based on said comparison.

* * * * *